Figure 1:
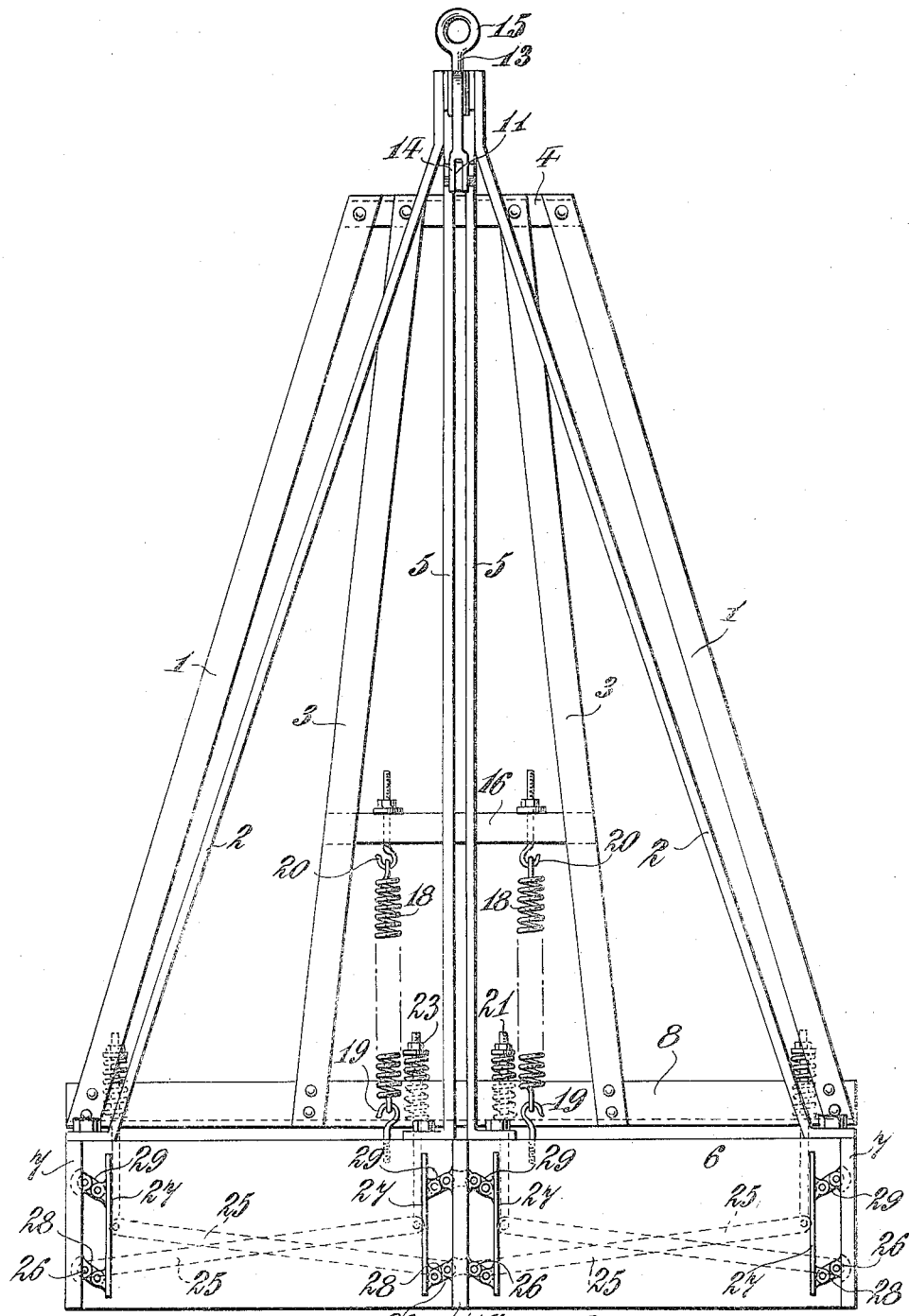

R. C. PENFIELD.
MACHINE FOR HANDLING BRICKS.
APPLICATION FILED NOV. 6, 1908.

975,713.

Patented Nov. 15, 1910.
3 SHEETS—SHEET 1.

R. C. PENFIELD.
MACHINE FOR HANDLING BRICKS.
APPLICATION FILED NOV. 6, 1908.

975,713.

Patented Nov. 15, 1910.

3 SHEETS—SHEET 3.

WITNESSES

INVENTOR
Raymond C. Penfield
BY
ATTORNEY

UNITED STATES PATENT OFFICE.

RAYMOND C. PENFIELD, OF NEW YORK, N. Y.

MACHINE FOR HANDLING BRICKS.

975,713.  Specification of Letters Patent.  Patented Nov. 15, 1910.

Application filed November 6, 1908. Serial No. 461,369.

*To all whom it may concern:*

Be it known that I, RAYMOND C. PENFIELD, citizen of the United States of America, residing at New York city, in the county of New York and State of New York, have invented certain new and useful Improvements in Machines for Handling Bricks, of which the following is a specification, reference being had therein to the accompanying drawing.

My invention is concerned with a machine for handling bricks, and is of the class adapted for use with bricks which have been set in a prearranged order in stack formation so as to be handled in bulk instead of individually.

Heretofore it has been customary in transporting bricks from point to point to give them a large number of handlings, each brick being manipulated over and over again as often as it was found necessary to change its position or place during the process of manufacture, or subsequently when it is presented for storage or use.

I have made certain improvements in the handling of bricks and have filed various applications for Letters Patent on the same, one of which I may refer to as my application on a "Method and apparatus for handling bricks," filed October 8, 1908, Serial No. 456,692.

The mechanism of which the present invention consists is a different kind from that shown in said application or in any other of my applications, though obviously most of these different mechanisms are intended for use in the same novel system of handling bricks in bulk so as to thus economize upon the old fashioned process of handling them individually.

When a machine is employed which can be caused to engage with a large mass of bricks set in stack formation and by such engagement the mass of bricks can be transported in bulk, a very large amount of time is saved, and great economy is achieved in the labor required for such handling.

In my application above mentioned, which is now pending in the Patent Office, I have described a method and device for lifting a mass of brick by setting the lower layer thereof in close formation consisting of a row of bricks arranged on edge close to each other without any intervening spaces between them, and then clamping the opposite ends of such basic row so tightly that the row will be, as it were, a consolidated unit, which when lifted will be so firmly held that it will carry with it a superposed mass consisting of a multiplicity of other rows of bricks set closely and accurately against each other, but arranged so as to overhang to a slight extent the shorter basic row, the intention of leaving spaces at the ends of the basic row below said overhanging ends of the superposed mass being to enable the clamping devices to be inserted at said points and then to be readily withdrawn when the mass of bricks has been transported to a distant point and set down, whereby the clamping members are not imprisoned at the ends of the basic layer but are free to be retracted, and thus every unit stack which is thus conveyed from one point to another can be set close against other similar unit stacks without any waste of space.

In my present invention, which may be treated particularly as an improvement upon the mechanism set forth in the aforesaid application just referred to, the said shorter basic layer is conceived of as split into two parts; that is to say, instead of having a row of bricks which are set solidly against each other from end to end, and having only a single pair of clamps which apply their pressure tightly against the ends of said single row, there is an intermediate point, say, preferably at the center of said row, where one or more bricks are withdrawn and a space is thereby left to permit the insertion of a clamping device at that point. The basic layer is intermediately split therefore between its ends and a clamping effect is produced centrally as well as terminally upon said basic layer whereby it is held more tightly and rigidly within the embrace of the clamping devices than is possible when the latter are applied at the ends alone, and yet this is by no means to be confounded with those other inventions of mine wherein the basic layer is spaced apart and a multiplicity of finger or clamping devices are inserted between the members of said basic layer, a system and mechanism which has great value for certain kinds of brick and in certain locations and for certain purposes.

In the present instance, the invention consists essentially in clamping mechanism arranged to be applied at the ends and centrally of a single layer of bricks which is generally shorter than the superposed mass, although I do not wish to be restricted to having the lower layer shorter than the superposed mass, since there are cases where it might be of the same length as the superposed mass.

Figure 2:
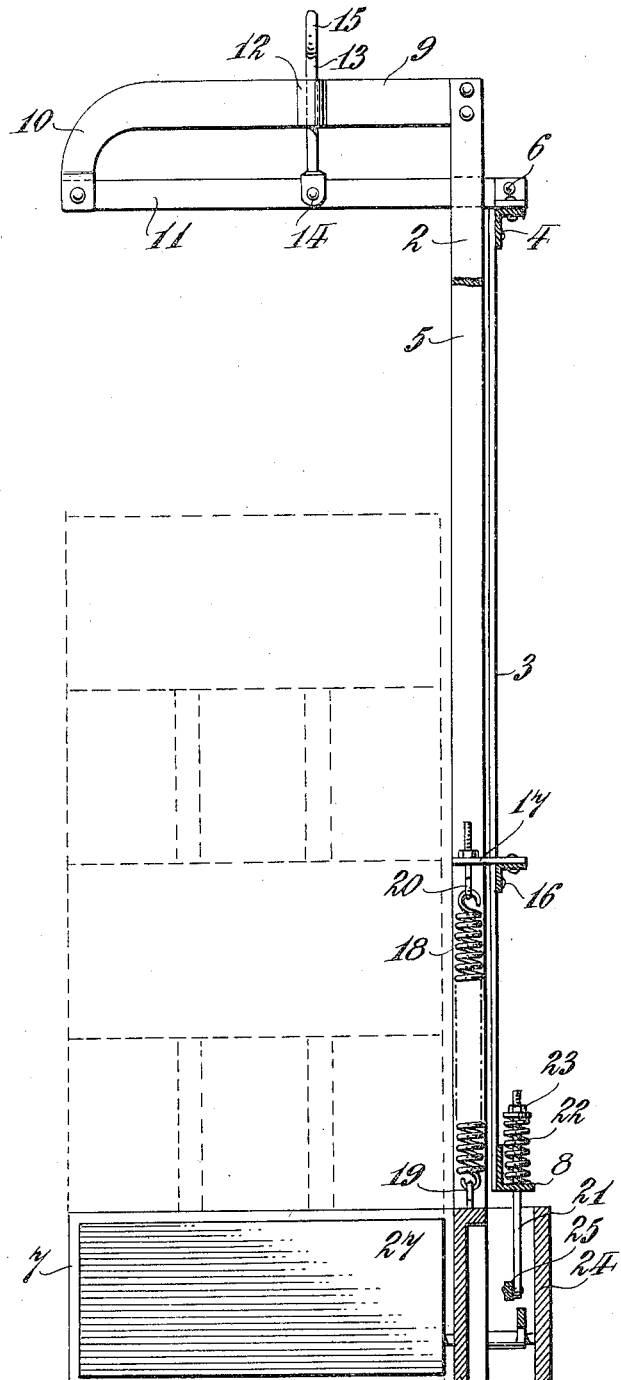
Figure 3:
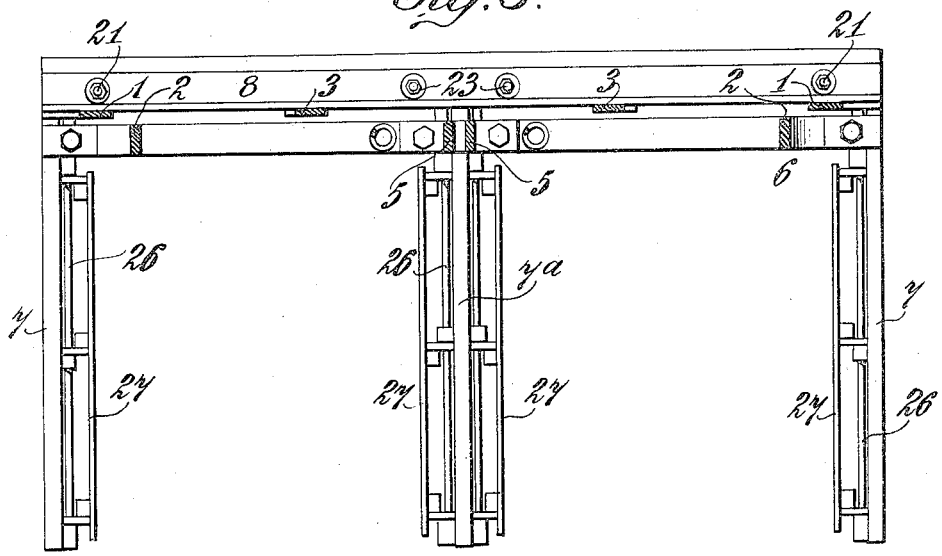
Figure 4:
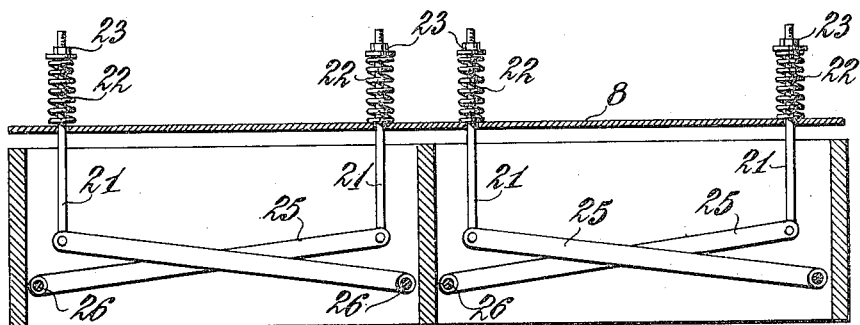
Figure 5:
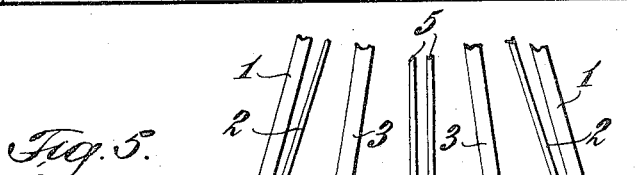

In the accompanying drawing, illustrating my invention, Figure 1 is a front elevation of my improved brick handling machine. Fig. 2 is a side elevation of the same in partial section. Fig. 3 is a sectional top plan view. Fig. 4 is a detail rear sectional view of the lower part of the frame, and shows certain parts of the leverage mechanism whereby the clamping members are actuated. Fig. 5 is a rear view showing how the bricks are hacked up with the basic layer made shorter than the upper mass and centrally divided to admit of the endwise and central clamping action.

Similar characters of reference designate corresponding parts throughout the different figures of the drawing.

The main frame may be fashioned in a variety of ways, that presented in the drawings being simply one specimen of the same. This consists of a vertically disposed structure having inclined side bars 2, 2 which are secured at their upper ends rigidly to a laterally turned arm 9 having a downwardly projecting outer end 10, to which is pivoted a lever 11 which is normally substantially parallel to the arm 9 but is adapted to oscillate relatively thereto. The arm 9 is provided with a vertical guide 12, within which reciprocates a vertical rod 13 having on its upper end an eye 15 adapted to be engaged by the hook belonging to a hoisting crane or other suspension means. The lower end of the rod 13 is pivotally attached at 14 to the lever 11, and the outer end of the lever 11 is pivoted at 6 to the upper end of a vertically movable frame which I shall presently describe. Between the inclined bars 2, 2 are two center parallel upright bars 5, 5 which are secured between the upper ends of the inclined bars 2, 2. The lower ends of the inclined bars 2, 2 and also the lower ends of the central vertical bars 5, 5 are bolted or otherwise firmly secured to the horizontal bar 6 at the base of the machine. This bar is a vertically placed, rather wide, piece, and to its ends are secured at right angles the horizontal side plates 7, 7; while at the center of the bar 6 and parallel to the side plates 7 is another similar vertical plate 7ª, so that in this way I employ three parallel vertical plates which are rigidly attached to or made integral with the base bar 6, all as clearly indicated in Figs. 2 and 3. It will thus be seen that the main frame consists of a vertically-disposed structure having at the base lateral plates which are designed to embrace the basic layer of bricks at the ends thereof after the manner of a bow or a rectangularly-shaped yoke; while at the center thereof is another projecting plate which is adapted to pass into the space left at the center of the basic row of bricks by the removal of a brick or two, as I have hereinabove suggested. These parallel plates 7, 7 and 7ª carry the clamping members which are arranged to apply power against parts of the basic row of bricks for the purpose of gripping and lifting the latter. These clamping members are designated 27. Each of the outer plates 7 carries one of them, while the center plate 7ª has one on each side thereof. Said clamping members 27 are pivoted at the rear to crank arms 28 which are carried rigidly by horizontal shafts 26. Said shafts 26 are supported in suitable bearings in the plates 7 and 7ª as indicated in Fig. 3. The shafts 26 are arranged to rock back and forth or oscillate. They are supported horizontally and extend from the outer ends of the plates 7 and 7ª through the aforesaid bearings which carry them and reach back through the main frame to a point where pairs of long levers 25 are situated, (see Fig. 4), the ends of said levers being rigidly fastened to the said rock shafts 26, so that in this way by the use of these long levers 25 a very strong leverage may be obtained. In order to keep the faces of the clamping members 27 parallel and vertical, I utilize links 29 which are pivotally attached to the rear sides of the clamping members 27 and also to the stationary plates 7 and 7ª so that these links 29 in conjunction with the crank arms 28 constitute in effect a parallel motion for the clamping members.

Alongside of that portion of the main frame, which I have been describing as consisting of the inclined bars 1 and coöperating parts, is a vertically-movable frame consisting of inclined side bars 1, 1 that are secured at their upper ends to a horizontal bar 4, and at their lower ends to a horizontal angle bar 8. Between the inclined bars 1, 1 are two more inclined bars 3, 3 which are likewise fastened to the top bar 4 and the bottom bar 8, and these bars 3, 3 are fastened together by means of a connecting angle bar 16 having thereon forwardly projecting arms 17. A pair of balancing springs 18 are arranged vertically between said arms 17 and the base bar 6 of the main frame, said springs being connected at their upper ends to hooks 20 which are carried by the arms 17 and at their lower ends to hooks 19 which are fastened to the base bar 20. The levers 25, above referred to, are pivoted at one end to the lower end of a vertical rod 21 which passes through an opening in the angle bar 8 and is provided with a spiral spring 22 which is coiled about the same, the tension of the spring being regulated by a nut 23 that is carried by the screw-threaded end of the rod 21. Thus in this particular embodiment of the invention, since there are four levers 25 and each one is pivoted to a vertical rod 21, there will be four of these latter rods 21 and they will all pass through the bottom angle bar 8 of the vertically-movable frame and be yieldingly connected thereto, as it were, by means of the interposed individual springs 22. Obviously the lifting of the vertically-movable frame will raise the angle bar 8 and this will cause the vertical rods 21 to be lifted with a yielding action due to the springs 22, and the result will be the vibration of the several levers 25, the rocking of the shafts 26, the movement of the crank arms 28, and the application of the clamping members 27 against the adjacent faces of the bricks with great power and effectiveness.

When the machine is in actual operation, and has been placed alongside of a previously set mass of brick material which it is desired to transport in bulk, the hoisting or lifting crane will be applied to the upper eye 15 and this will lift the lever 11 and turn the same on its fulcrum at the lower end 10 of the arm 9, the result of which will be that the vertically-movable frame will be lifted by said lever 11 and the clamps will be automatically set against the brick in the manner I have herein indicated. The balancing springs 18, to which I have alluded, act to cause the parts to move jointly with regularity and evenness, and also assist in returning the vertically-movable frame to its normal position after the lifting and transporting operation has been concluded. Of course there may be two or more of the springs 18 and I do not wish to be confined to any particular number. The lifting of the frame which is connected through the rods 21 to the levers 25 will bring the clamps 27 against the bricks and will result in very tightly laying hold of the basic layer. It will be found in practice, moreover, that for many purposes the gripping of the basic layer at an intermediate point, as well as at two opposite points, such as the ends thereof, will cause a tighter and firmer hold to be had upon the basic layer than when only the end points are gripped.

Many changes may be made in the exact construction and arrangement of the various parts without exceeding the scope of the invention, and I reserve the liberty of rearranging the details as may be found desirable. It must be borne prominently in mind, however, at all times that this invention is intended to lift a mass of material by gripping the lower course thereof at opposite points and at a point intermediate of said opposite points. This is the broad thought in the invention, and it is susceptible obviously of a wide diversity in the mechanism for carrying it into effect.

Having thus described my invention, what I claim as new and desire to secure by Letters Patent, is:

1. A machine for handling bricks, comprising a frame, laterally extended clamp plates carried by the lower end of said frame, crank arms pivotally connected to said plates for operating the same, rock shafts carrying said crank arms, a lever mechanism for operating the crank arms and applying the clamping power, a lever mechanism at the top of the frame for enabling the initial lifting movement to automatically actuate the clamping plates, all arranged so that the mass to be lifted and transported may be gripped at two points which are opposite to each other and at a third point intermediate of the last two points.

2. A machine for handling bricks, comprising a frame, clamps carried thereby, rock shafts carrying arms pivoted to said clamps, a lever mechanism for actuating the crank arms, a lever mechanism at the top of the frame for enabling the initial lifting movement to automatically actuate the clamping plates, a vertically movable frame carrying the clamps, a yielding connection between it and the main frame, and yielding means for taking up looseness between the clamps and the bricks and compensating for inequalities in the bricks.

3. A machine for handling bricks, comprising a vertically-disposed frame having a laterally turned upper arm, a lever device pivoted thereto, suspension means acting on said lever device, a vertically-movable frame pivoted to the end of said lever, clamps acting against the ends of a basic layer of bricks which is shorter than the superposed mass, and also acting at a point intermediate in the length of said layer of bricks, pairs of levers whose members are arranged crosswise of each other and are arranged to operate said clamping members, vertical spring-provided rods for connecting the ends of said operating levers with the lower end of the vertically-movable frame, all combined and arranged to operate substantially as set forth.

In testimony whereof I affix my signature in presence of two witnesses.

RAYMOND C. PENFIELD.

Witnesses:
  FRANK PAUL,
  C. B. SCHROEDER.